Figure 1:
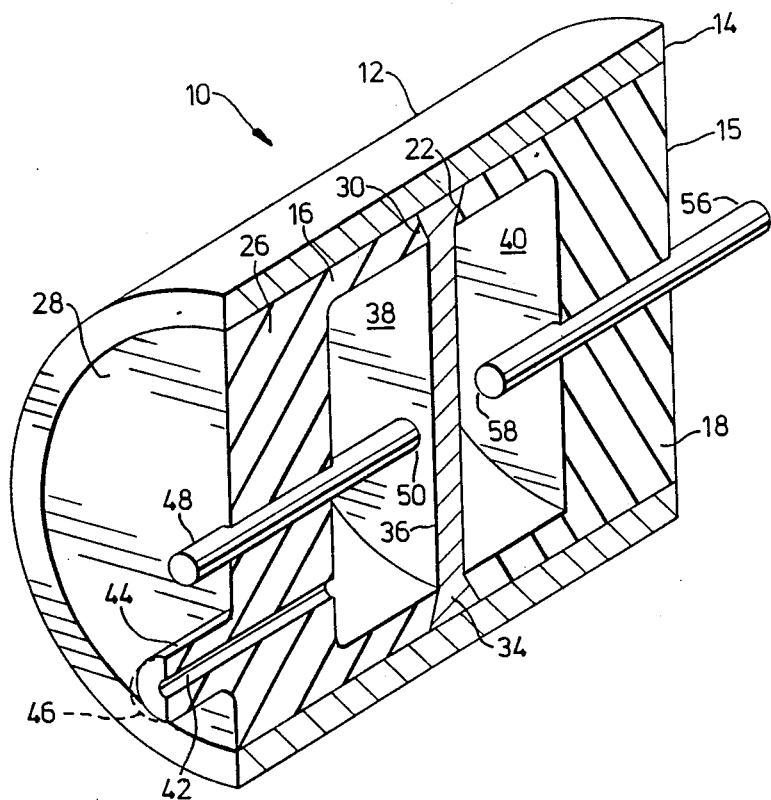

United States Patent [19]

Ballyns

[11] Patent Number: 4,890,090
[45] Date of Patent: Dec. 26, 1989

[54] PRESSURE ALARM SYSTEM FOR MOTOR VEHICLE TIRES

[76] Inventor: Jan Ballyns, 1125 Meadowland Crescent, Pickering, Ontario, Canada, L1X 1E5

[21] Appl. No.: 202,262

[22] Filed: Jun. 6, 1988

[51] Int. Cl.$^4$ .............................................. B60C 23/00
[52] U.S. Cl. .................................. 340/442; 73/146.5; 73/146.8; 200/61.22; 200/61.25; 200/83 N; 116/34 R
[58] Field of Search ................ 340/58, 442; 73/146.2, 73/146.3, 146.8, 146.5; 200/61.25, 83 N, 61.22; 116/34 R, 34 A, 34 B

[56] References Cited

U.S. PATENT DOCUMENTS

| | | | |
|---|---|---|---|
| 2,721,913 | 10/1955 | Kent, Jr. | 200/83 N |
| 3,256,399 | 6/1966 | Palmer | 200/83 N |
| 3,267,233 | 8/1966 | Basile et al. | 200/83 N |
| 3,268,683 | 8/1966 | Palmer | 200/83 N |
| 3,693,149 | 9/1972 | Johnston | 340/58 |
| 3,743,801 | 7/1973 | Brobeck et al. | 340/58 |
| 3,760,350 | 9/1973 | Johnson | 340/58 |
| 4,048,614 | 9/1977 | Shumway | 340/58 |
| 4,059,823 | 11/1977 | Martin et al. | 340/58 |
| 4,211,901 | 7/1980 | Matsuda et al. | 200/83 B |
| 4,694,273 | 9/1987 | Franchico | 340/58 |

Primary Examiner—Donnie L. Crosland
Attorney, Agent, or Firm—Fetherstonhaugh & Co.

[57] ABSTRACT

A pressure sensitive electrical switch consists of a housing in which two pressure chambers are formed. The pressure chambers are separated by a flexible diaphragm. The flexible diaphragm is made from electrical conductive material. Conductors extend into the housing to provide terminals which are spaced from the diaphragm when the pressure in the two chambers is substantially equal. When a pressure differential is established between the two chambers, the diaphragm may be deflected into contact with one or other of the terminals of the conductors. In use, the diaphgram is connected in an electrical circuit and each of the conductors is connected in an electrical circuit such that when contact is made between the diaphragm and one of the conductors, the electrical circuit will be complete. Because the diaphragm is at least partially permeable, this switch is intended to be used to monitor changes in pressure which occur between the two chambers over a relatively short period of time. This switch is used to advantage in a tire pressure warning system in which it serves to activate a transmitter which will transmit a signal indicating that the pressure in the tire has changed at an undesirable rate. In this system a receiver is provided for receiving the signal which is emitted by the transmitter and an alarm is provided which is activated by the receiver to generate an alarm signal.

6 Claims, 5 Drawing Sheets

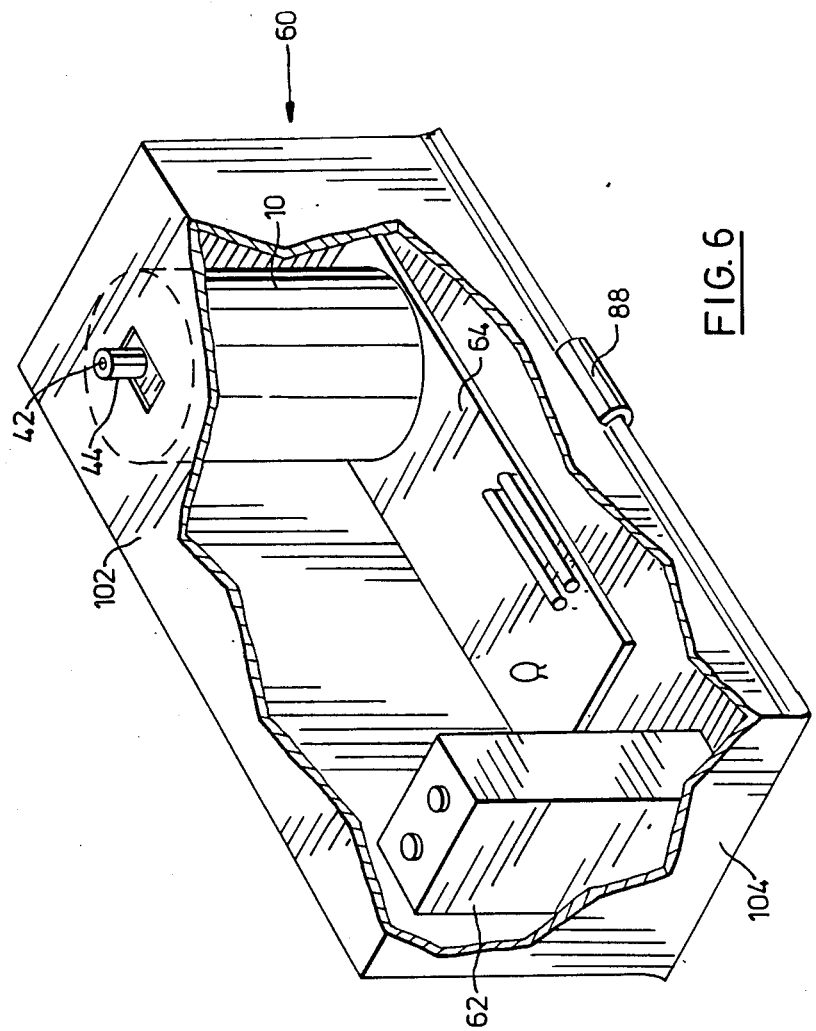

PRESSURE ALARM SYSTEM FOR MOTOR VEHICLE TIRES

FIELD OF INVENTION

This invention relates to pressure sensitive electrical switches and a tire pressure warning system incorporating a pressure sensitive electrical switch.

RELATED APPLICATIONS

A pressure sensitive electrical switch is disclosed in the applicant's co-pending U.S. application Ser. No. 06/069,958 filed July 6, 1987, now abandoned.

PRIOR ART

The pressure sensitive switch of the present invention is of a more conventional construction than that of the prior application in that it uses a flexible diaphragm to detect pressure changes rather than a mercury switch mechanism.

A characteristic of flexible diaphragms and in particular, diaphragms which have a thin flexible membrane is that although the membrane may be considered to be substantially impermeable, air does tend to permeate the membrane if a pressure differential is maintained in chambers on opposite sides of the diaphragm for any substantial period of time. Similarly, if the housing in which a flexible membrane is mounted is made from a plastics material, air is likely to permeate through the wall of the housing over an extended period o+time with the result that it is difficult to maintain a constant pressure in an isolated chamber which is located in a housing wherein the chamber is cloaed by means of a flexible membrane. It follows that it is difficult to provide a sealed chamber in a pressure sensitive switch which can act as a reference pressure chamber for use in installations which are required to operate for a long period of time without servicing or without replenishing losses in air pressure due to the permeability of the membrane and housing.

As a result of the difficulties discussed above, it is difficult to use a pressure sensitive switch of the type which has a reference pressure chamber sealed with a flexible diaphragm in a device for monitoring the pressure in a tire of a motor vehicle or the like because the change in the pressure in the tire may occur so gradually that the permeability of the flexible membrane may be sufficient to prevent the establishment of a pressure differential sufficient to deflect the membrane to an extent sufficient to activate a switching mechanism. For this reason, I prefer to monitor the rate of change of pressure in a tire and to generate an alarm signal when there is an indication that the rate of change in pressure is indicative of a hazardous condition.

The pressure sensitive switches which employ flexible diaphragms as the moving component generally utilize the diaphragm for the purpose of mechanically manipulating the contact points of the switch.

I have found that it is possible to simplify the construction of a pressure sensitive electrical switch by forming the flexible diaphragm from an electrically conductive flexible material which functions as a moving contact which serves to make and break contact with a fixed contact in response to movement of the diaphragm resulting from changes in pressure differential across the diaphragm.

SUMMARY OF INVENTION

According to one aspect of the present invention, there is provided a pressure sensitive electrical switch comprising a housing having a pressure chamber formed therein, an electrical conductive flexible diaphragm mounted in said housing and forming a wall of said pressure chamber, said diaphragm being adapted to move to and fro between a first position and a second position in response to a predetermined change in the pressure in said chamber, a passage opening from said chamber through which said chamber may communicate with a fluid pressure system, first conductor means having a first contact disposed opposite said flexible diaphragm so as to be out of contact with said diaphragm when it is in its first position and to make contact with said diaphragm when it is in its second position, said first conductor means being accessible for connection to an electrical circuit, means for connecting said diaphragm to said electrical circuit such that said switch is open when said diaphragm is in its first position and closed when said diaphragm is in its second position.

According to a further aspect of the present invention, there is provided a pressure sensitive electrical switch which responds to the rate of change in the pressure in a fluid pressure system comprising a housing having first and second pressure chambers formed therein, an electrically conductive flexible diaphragm mounted in said housing and separating said first and second pressure chambers, said diaphragm being adapted to move within said chambers from a first position to a second position in response to a first predetermined change in the pressure differential between the pressure in the first chamber and the pressure in the second chamber, first passage means opening from said first pressure chamber through which the first pressure chamber may communicate with the fluid pressure system in use, first conductor means mounted in said housing and having a first contact located in said first chamber so as to be out of contact with said diaphragm when it is in its first position and to make contact with said diaphragm when it is in its second position, said first conductor means being accessible for connection to an electrical circuit, means for connecting said diaphragm to an electrical circuit such that said switch is open when said diaphragm is in its first position and closed when said diaphragm is in its second position.

According to a still further aspect of the present invention, there is provided a tire pressure warning system for use in association with a wheel assembly of a motor vehicle which comprises a wheel having an inflated pneumatic tire mounted on a rim to form an inflation chamber therebetween, a tire inflation valve having a stem portion and a head portion projecting radially from one end of the stem, said inflation valve being mounted on said rim with the head portion located within the pressure chamber and the stem portion projecting through a valve mounting passage formed in the rim, the improvement of a pressure sensitive electrical switch mounted in said inflation chamber, said pressure sensitive electrical switch responding to the rate of change in the air-pressure in the inflation chamber to close when an undesirable rate of change is detected, transmitter means located within said inflation chamber and electrically connected to a power source through said pressure sensitive switch so as to be activated when said switch is closed to transmit a warning signal, alarm means remote from said wheel for generating an alarm signal, receiver means remote from said wheel for receiving the warning signal which is emitted by the transmitter, said receiver means communicating with said alarm means to activate said alarm means to cause it to generate said alarm signal when the warning signal is received.

PREFERRED EMBODIMENT

Figure 2:
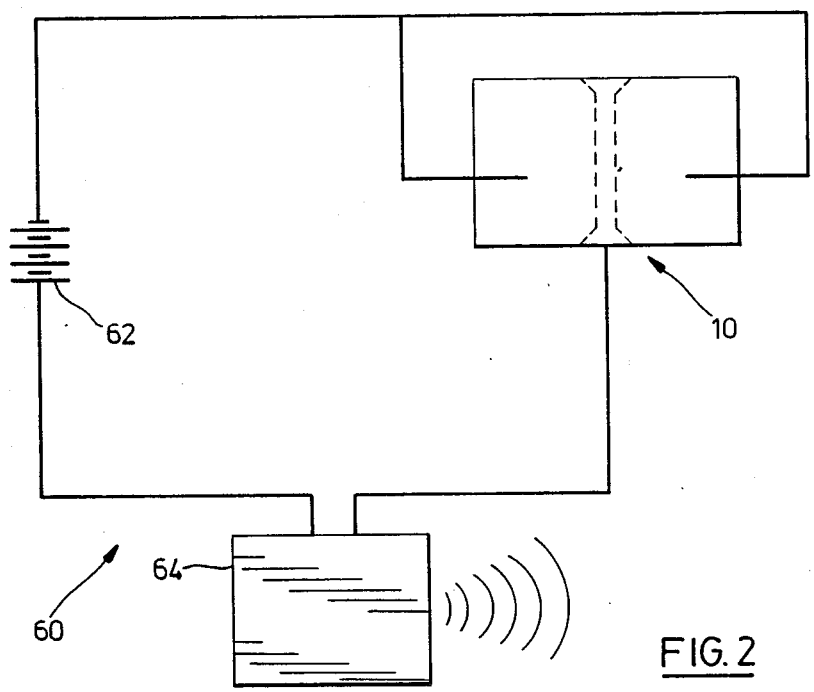
Figure 3:
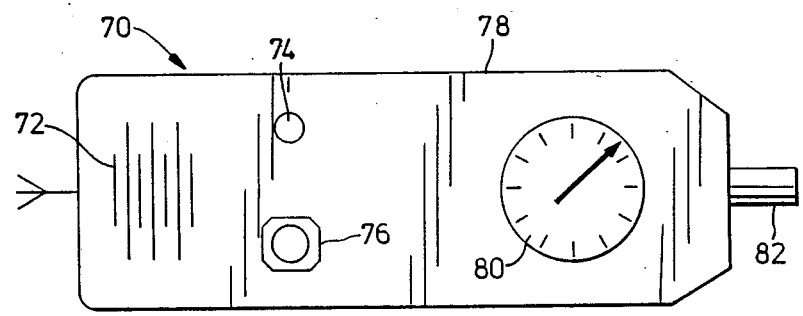
Figure 4:
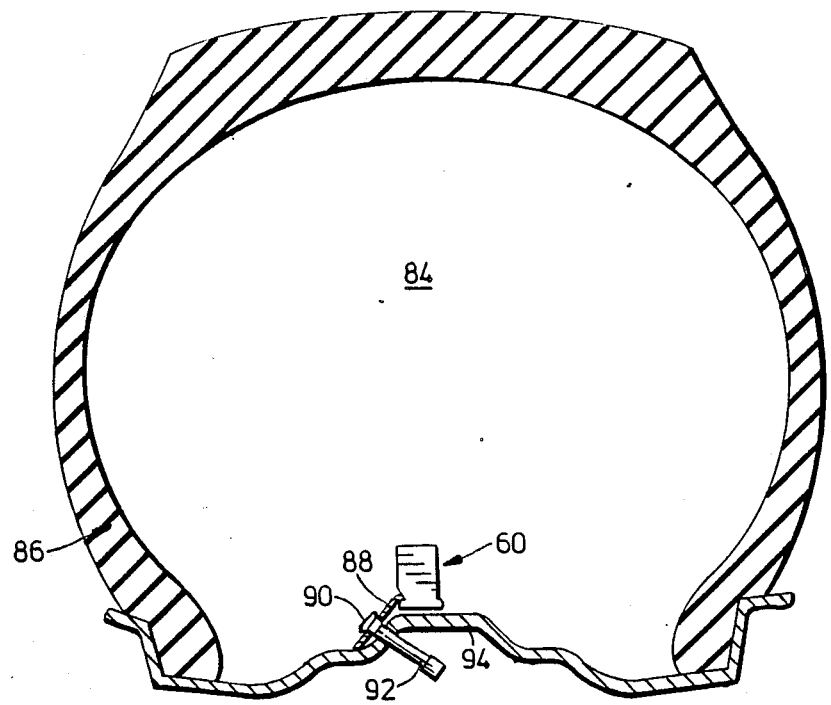
Figure 5:
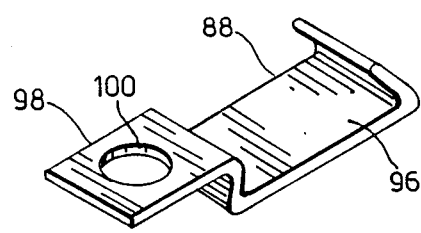
Figure 8:
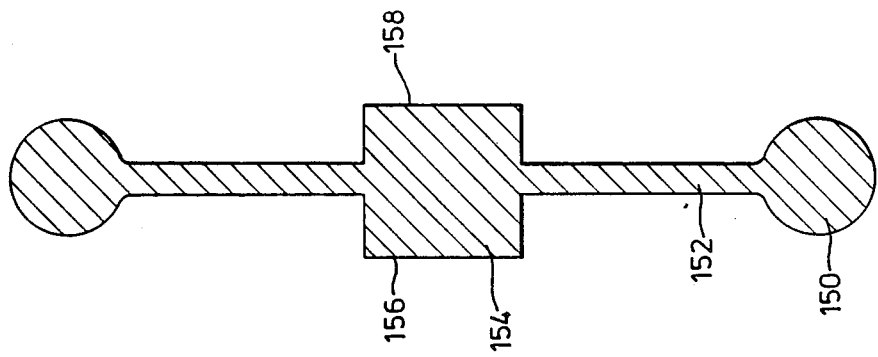
Figure 7:
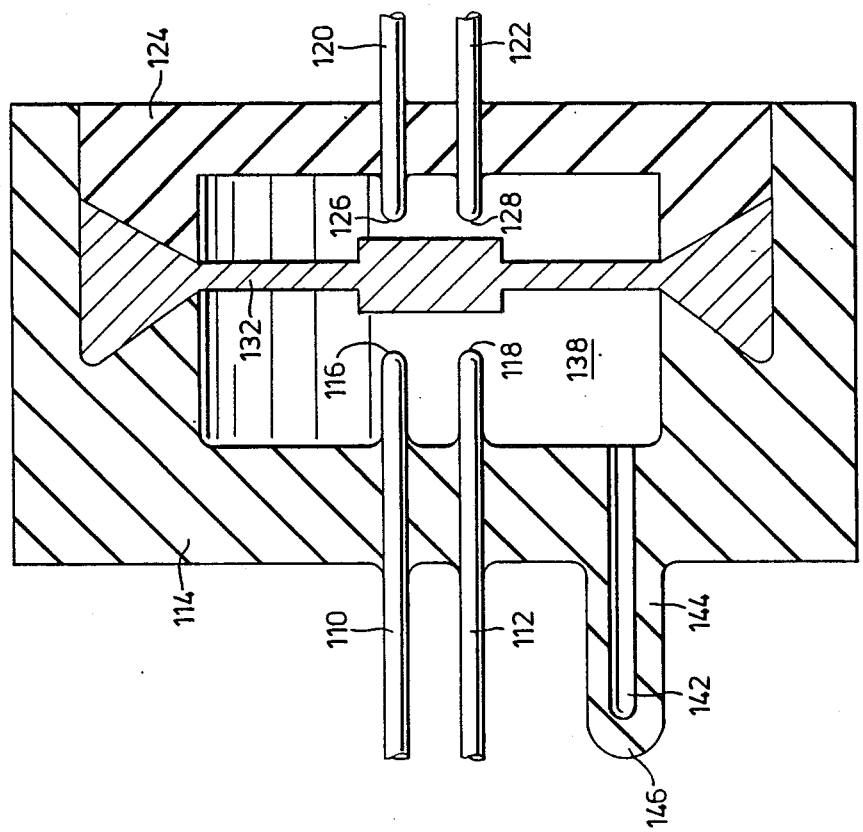

The invention will be more clearly understood after reference to the following detailed specification read in conjunction with the drawings wherein;

FIG. 1 is a sectional side view of a pressure sensitive electrical switch constructed in accordance with an embodiment of the present invention, FIG. 2 is a diagram illustrating a pressure sensitive transmitter assembly incorporating the pressure sensitive switch of FIG. 1, FIG. 3 is a diagrammatic representation of a receiver for use in association with the transmitter of FIG. 1, FIG. 4 is a sectional view taken through an inflated wheel assembly illustrating the manner in which the transmitter and pressure sensitive switch are mounted within the inflation chamber of a tire, FIG. 5 is a pictorial view of the mounting bracket of FIG. 4, FIG. 6 is a partially sectioned pictorial view of a pressure sensitive transmitter assembly, FIG. 7 is a sectional side view through a portion of a pressure sensitive switch constructed in accordance with a further embodiment of the present invention, FIG. 8 is a sectional view taken through a membrane suitable for use in association with the switch constructed in accordance with FIG. 7.

With reference to FIG. 1 of the drawings, the reference numeral 10 refers generally to a pressure sensitive electrical switch constructed in accordance with an embodiment of the present invention.

The pressure sensitive electrical switch 10 comprises a housing 12 which is constructed from three components which are identified by the reference numerals 14, 15 and 16. The component 14 is a cylindrical-shaped sleeve member which has a bore 20. The component 14 is made from a material which will act as a conductor such as brass or copper.

The component 16 is formed from an insulating material and has a cylindrical side wall 26 and an end wall 28. The cylindrical side wall 26 has an end face 30 which is outwardly and rearwardly inclined toward the end wall 28. The cylindrical side wall 26 is proportioned to fit in an interference fitting relationship within the bore 20 of the component 14. The component 15 is formed from an insulating material and has a cylindrical side wall 24 and an end wall 18. The side wall 24 has an end face 22 which is outwardly and rearwardly inclined toward the end wall 18. A flexible diaphragm is formed with a perimeter mounting ring 34 and a thin flexible membrane 36. The mounting ring 34 is wedged between the end face 22 and the end face 30. It will be seen that the mounting ring 34 will be urged into contact with the inner face of the component 14 to form a good electrical contact therebetween.

The components 14, 15 and 16 and the flexible diaphragm 32 are assembled as shown in FIG. 1 such that the membrane 32 serves to separate the first pressure chamber 38 from the second pressure chamber 40. The second pressure chamber 40 is a sealed chamber. The first pressure chamber 38 has an access passage 42 which extends through a nipple 44 and is initially closed by a frangible end wall 46. The components 14, 15 and 16 and the diaphragm are assembled in an environment which is pressurized to the ambient or control pressure which is required in the second chamber 40 in use, which is the situation in which the device is to be used in a tire of a truck or the like is about 100 psi.

A first conductor 48 is mounted in the end wall 28 and projects into the first pressure chamber 38. The inner end 50 of the first conductor 48 is arranged to spaced from the diaphragm 32 and serves to form a first electrical contact.

A second conductor 56 is mounted in the end wall 18 and projects therethrough. The second conductor 56 serves to provide a second contact 58 which is arranged in a spaced relationship with respect to the membrane 36 when it is in its normal position illustrated in FIG. 1. Preferably, the contacts 50 and 58 are equally spaced from the membrane 36. It will be apparent that when a pressure differential is established between the chambers 38 and 40, the flexible membrane 32 will be deflected toward the low pressure chamber and when a predetermined pressure differential is established, the membrane 36 will make contact with one or other of the contacts 50 or 58 to effectively close the switch to permit current to flow through the component 14, membrane 36 and either of the conductors 48 or 56 depending upon which of the conductors is in contact with the diaphragm 36.

The flexible diaphragm 32 is made from an electrically conductive silicone rubber material such as that manufactured by Armet Industries Corporation of Tilsonburg, Ontario, Canada. This material is substantially impermeable to air, however, a significant amount of air may permeate the membrane 36 if a pressure differential is maintained between the chambers 38 and 40 for an extended period of time (i.e. several days).

By pressurizing the chambers 38 and 40 to an initial pressure which is close to the operating pressure in the system which is to be monitored, the membrane 32 will assume the neutral position. When the switch is to be used, the end wall 46 is removed from the nipple 44 to open the passageway 42. The passageway 42 is then placed in communication with the pressure system which is to be monitored so that the pressure in the system is applied to the first pressure chamber 38. If the pressure differential between the chambers 38 and 40 is greater than that within which the switch is designed to remain open, the flexible membrane 32 will be deflected into contact with one or other of the contacts 50 or 58 as previously indicated to close the switch 10.

When the pressure sensitive switch 10 is assembled in a pressurized environment, the chambers 38 and 40 are pressurized to a pressure which is substantially equal to the normal operating pressure. Any pressure differential which is initially present will gradually diminish as a result of the fact that the air will eventually permeate the membrane 32. The air pressure is maintained in the chambers 38 and 40 by reason of the end wall 46 which closes the passage 42.

As shown in FIG. 2 of the drawings, the switch 10 may be used to advantage in a pressure sensitive transmitter assembly 60. The transmitter assembly 60 includes a power source in the form of an electrical battery 62 and a transmitter 64. A pressure sensitive transmitter assembly 60 of the type described in FIG. 2 of the drawings which is to be used in a tire pressure warning system may employ a battery such as one or more double-A 1.5 volt long-life batteries and a transmitter in the form of a commercially available short-wave radio transmitter such as the type commonly used to control the opening and closing of garage door mechanisms or the like.

A portable receiver suitable for use in association with the transmitter assembly of FIG. 2 is generally identified by the reference numeral 70 in FIG. 3 of the drawings. The receiver 70 may be of any conventional construction compatible with the transmitter 42. The receiver 70 has an audible alarm 72 and a visual alarm 74. The audible alarm 72 may in the form of an alarm buzzer and the visual alarm may be in the form of an LED. A cancellation button 76 is provided for interrupting the alarm circuit of the receiver. Receivers which generate audible alarms and activate visually detectable indicators in response to the receipt of a predetermined signal are well known and will not therefore be described in detail. The receiver of the present invention is mounted in a portable housing 78 in which a conventional pressure gage 80 may also be mounted. The pressure gage 80 has a connecting nipple 82 of a type suitable for forming a connection with the inflation valve of a tire or the like. The pressure gage 80 is designed to give a reading of the pressure detected when the connecting conduit 82 is coupled to a valve of a tire or the like.

As previously indicated, the pressure sensitive transmitter assembly 60 may be mounted within the inflation chamber 84 of a pneumatic tire assembly of the type generally identified by the reference numeral 86. The transmitter assembly 60 is mounted on a bracket 88 which is in turn mounted on the inner end 90 of the valve stem 92 which is mounted on the well rim 94.

The mounting bracket 88 is illustrated in FIG. 5 of the drawings wherein it will be seen that it is shaped to provide a seat 96 and a mounting flange 98 in which a mounting passage 100 is formed. The mounting passage 100 is proportioned to receive the valve stem 92. The seat 96 has a generally dove-tail configuration.

With reference to FIG. 6 of the drawings, it will be seen that the transmitter assembly 60 is mounted in a housing 102 which has a base portion 104 which has a dove-tail cross-sectional configuration corresponding to that of the seat 88. The battery 62, transmitter 64 and pressure-sensitive switch 10 are all accommodated within the housing 102 with the nipple 44 projecting through a wall of the housing 102 so that the through passage 42 will open into the inflation chamber 84 when the end wall 46 is removed.

A pressure sensitive switch constructed in accordance with a further embodiment of the present invention is illustrated in FIG. 7 of the drawings to which reference is now made. In the embodiment illustrated in FIG. 7 of the drawing, conductors 110 and 112 are mounted in the end wall 114 in a spaced parallel relationship to provide contacts 116 and 118. Similarly, conductors 120 and 122 are mounted in the side wall 124 to provide terminals 126 and 128 on the opposite side of the diaphragm 132. An input passage 142 extends through a nipple 144 into the first chamber 138. The through passage 142 is normally closed by an end wall 146. In this embodiment, the diaphragm 132 is deflected into contact with the contacts 116, 118 or the contacts 126, 128 depending upon the direction in which the diaphragm is deflected. When the diaphragm makes contact with the contacts 116, 118, current can flow from the conductor 110 to the conductor 112. Similarly, when the diaphragm 132 makes contact with the contacts 126 and 128, current can flow through the conductor 120 to the conductor 122.

In a still further modification which is not shown, only one set of contacts 116, 118 may be provided on one side of a diaphragm so that movement of the diaphragm can make and break the contact between the contacts 116 and 118 as required in use.

A diaphragm suitable for use in the embodiments illustrated in FIG. 7 of the drawings is shown in cross-section in FIG. 8. The diaphragm includes an annular perimeter ring 150, a flexible membrane 152 and a central boss 154. As previously indicated, the diaphragm is made from a flexible material which is capable of conducting electricity. When the annular ring 152 is clamped between the shoulder 24 and end face 30 (FIG. 1), it will be deformed to assume the generally triangular configuration illustrated in FIG. 1 and this will serve to lock the ring 150 in the housing.

The boss 154 is particularly suitable for use in the embodiments illustrated in FIG. 7 of the drawings wherein it is desirable to provide flat end faces 156 and 158 in order to establish contact between the contacts 116, 118 and between the contacts 126, 128 as previously described. The boss 154 and the membrane 152 are each circular in front view.

As previously indicated, when the pressure sensitive switch is initially assembled, the chambers 38 and 40 are pressurized to a pressure which is about equal to the pressure in the environment in which the pressure sensitive switch is designed to operate in use. In a typical installation such as the inflation chamber of a pneumatic tire such as that used in the trucking industry, the chambers 38 and 40 would be pressurized to about 100 psi gage. The pressure sensitive switch can be stored in this condition for an extended period of time because little or no load will be applied to the membrane because there is little or no pressure differential between the pressure chambers 38 and 40 and any pressure differential which may initially exist will diminish by reason of the permeability of the membrane 36. When the pressure sensitive switch is to be used in the manner illustrated in FIG. 4 of the drawings, the end wall 46 of the nipple is removed to open the passage 42. As a result, the pressure in the chamber 38 will drop and the membrane 36 will be deflected to make contact with the contact 50. This procedure can be used to test the transmitter to ensure that it will function to emit a warning signal. When the pressure sensitive switch is installed, the tire is then inflated and inflation will continue until the required pressure is established within the inflation chamber 84. This pressure will be transmitted to the pressure chamber 38 of the pressure sensitive switch and will serve to deflect the membrane 36 back to the neutral position. If the tire is over-inflated, the membrane 36 will be deflected to make contact with the contact 58 and this will again activate the transmitter to generate a warning signal. After the tire has been correctly inflated, the membrane 36 will be located in a position which is very close to the neutral position shown in FIG. 1 of the drawings. If there is a pressure differential between the pressure in the inflation chamber 84 and that in the reference chamber 40, the pressure differential will be reduced in time by reason of the permeability of the membrane 36. As previously indicated, even membranes which are considered to be substantially impermeable are not totally impermeable with the result that some transfer of air will take place over an extended period of time resulting in the elimination of pressure differentials which are maintained over a long period of time. If, however, the pressure in the inflation chamber 84 decreases or increases to an undesirable extent at a rate which is greater than the rate at which air can permeate the membrane 36, the membrane 36 will be deflected to form contact with the contact 50 or 58 to activate the transmitter which will in turn emit a warning signal which will activate the alarm mechanisms of the receiver as previously described.

Various modifications of the present invention over and above those described herein will be apparent to those skilled in the art.

I claim:

1. A pneumatically operated pressure sensitive electrical switch for detecting a hazardous rate of change of pressure in a pressure sensitive pneumatic system comprising;
   (a) a housing having a pressure chamber formed therein,
   (b) a flexible diaphragm mounted in said housing, said diaphragm forming a wall of said pressure chamber which serves to separate the pressure chamber from aid pneumatic pressure system in use, said diaphragm being free to move independently to and fro between a first position and a second position in response to said hazardous rate of change in the pressure in the pressure system, said diaphragm being sufficiently permeable to permit air to pass therethrough at a rate which will serve to permit equalization of the pressure on opposite sides of the diaphragm at a rate that would prevent the detection of a change in the pressure in said pressure sensitive system which occurs at a rate that is less than said hazardous rate, said diaphragm being sufficiently impermeable to prevent the passage of air therethrough at a rate which will serve to prevent equalization of the pressure on opposite sides of the diaphragm at a rate which would prevent the movement of the diaphragm from said first position to said second position when said hazardous rate of change occurs in the pressure in said pressure sensitive system,
   (c) switch means carried by said housing and communicating with said diaphragm to open and close in response to movement of said diaphragm to and from between said first and second positions.

2. A switch as claimed in claim 1 wherein said flexible diaphragm is an electrically conductive diaphragm and said switch means comprises;
   (a) first conductor means having a first contact disposed opposite said flexible diaphragm so as to be out of contact with said diaphragm when it is in said first position and to make contact with said diaphragm when it is in said second position, said first conductor means being accessible for connection to an electrical circuit,
   (b) means for connecting said diaphragm to said electrical circuit such that said switch is open when said diaphragm is in its first position and closed when said diaphragm is in its second position.

3. A switch as claimed in claim 1 wherein a pressure sensing chamber is formed in said housing, said pressure sensing chamber being separated from said pressure chamber by said diaphragm.

4. A switch as claimed in claim 2, wherein said means for connecting said diaphragm to an electrical circuit comprises a second conductor means mounted in said housing and having a second contact located in a side-by-side spaced relationship with respect to said first contact so as to be out of contact with said diaphragm when it is in its first position and to make contact with said diaphragm when it is in said second position such that the first and second conductors are electrically connected to one another through said diaphragm when said diaphragm is in its second position.

5. In an inflation chamber of a tire which is inflated to a predetermined inflation pressure the improvement of an alarm system for generating an alarm signal when air leaks from the inflation chamber at a rate which could be hazardous comprising:
   (a) a housing mounted in said inflation chamber, said housing having a pressure chamber formed therein,
   (b) a flexible diaphragm mounted in said housing, said diaphragm forming a wall of said pressure chamber which serves to separate the pressure chamber from said inflation chamber such that said diaphragm is free to move independently to and fro between a first position and a second position in response to said hazardous rate of change in the pressure in the inflation chamber, said diaphragm being sufficiently permeable to permit air to pass therethrough at a rate which will serve to permit equalization of the pressure in the pressure chamber and the inflation chamber on opposite sides of the diaphragm at a rate that will prevent the detection of a change in the pressure in said inflation chamber which occurs at a rate that is less than said hazardous rate, said diaphragm being sufficiently impermeable to prevent the passage of air therethrough at a rate which will serve to prevent equalization of the pressure in the pressure chamber and the inflation chamber on opposite sides of the diaphragm at a rate which would prevent the movement of the diaphragm from said first position to said second position when said hazardous rate of change occurs in the pressure in said pressure sensitive system,
   (c) alarm means communicating with said diaphragm and operable to generate an alarm signal in response to movement of said diaphragm from said first position to said second position.

6. An alarm system as claimed in claim 5 wherein said alarm means comprises;
   (a) transmitter means located within said inflation chamber and electrically connected to a power source through said pressure sensitive switch so as to be activated when said switch is closed to transmit a warning signal,
   (b) alarm generating means remote from said tire for generating an alarm signal,
   (d) receiver means remote from said tire for receiving the warning signal which is emitted by the transmitter, said receiver means communicating with said alarm generating means to activate said alarm generating means to cause it to generate said alarm signal when the warning signal is received.

* * * * *